United States Patent [19]

Sherman

[11] Patent Number: 5,059,296
[45] Date of Patent: Oct. 22, 1991

[54] PORTABLE SELF-CONTAINED SOLAR POWERED WATER PURIFIER

[75] Inventor: Mark Sherman, St. Louis, Mo.

[73] Assignee: Floatron, Inc., St. Louis, Mo.

[21] Appl. No.: 585,511

[22] Filed: Sep. 20, 1990

Related U.S. Application Data

[63] Continuation-in-part of Ser. No. 510,104, May 11, 1990, which is a continuation of Ser. No. 301,177, Feb. 21, 1989, abandoned.

[51] Int. Cl.$^5$ .................. C25B 9/00; C25B 11/02; C25B 15/08
[52] U.S. Cl. .................. 204/228; 204/267; 204/271; 204/277; 204/278; 204/279; 204/293; 204/DIG. 5; 204/273; 204/272
[58] Field of Search ........ 204/149, 242, 272, 275–278, 204/270–271, 292, 293, 237, 267, 228, 279, DIG. 5, 273

[56] References Cited

U.S. PATENT DOCUMENTS

| | | | |
|---|---|---|---|
| 3,222,269 | 12/1965 | Stanton | 204/278 X |
| 4,337,136 | 6/1982 | Dahlgren | 204/242 |
| 4,352,722 | 10/1982 | Ohkawa | 204/278 X |
| 4,525,253 | 6/1985 | Hayes et al. | 204/275 X |
| 4,525,272 | 6/1985 | Henson | 204/272 X |
| 4,565,617 | 1/1986 | Ahuja | 204/278 X |
| 4,769,119 | 9/1988 | Grundler | 204/228 X |
| 4,936,979 | 6/1990 | Brown | 204/237 X |

FOREIGN PATENT DOCUMENTS 8601543  3/1986  World Int. Prop. O. .......... 204/271

Primary Examiner—Donald R. Valentine
Attorney, Agent, or Firm—Polster, Polster and Lucchesi

[57] ABSTRACT

A portable self-contained solar powered water purifier for swimming pools, spas, and other bodies of water is disclosed. The purifier includes a buoyant housing for supporting a solar cell array above the surface of water to be treated and a purification cell below the surface of water to be treated. Suitable electrical connections, between the solar cell array and purification cell, are sealed to prevent the entry of water therebetween which could result in electrical shorts and corrosion. The purification cell includes a sacrificial anode, having a metal alloy essentially composed of copper and silver and a cathode which is preferably constructed of stainless steel so as to not react adversely with the sacrificial anode. Metallic copper and silver ions are released by the sacrificial anode to prevent algae and bacterial growth. The anode and cathode are structurally interrelated and secured to each other and to the buoyant housing and the solar cell array to provide a practical, durable and long lasting unit.

39 Claims, 7 Drawing Sheets

PORTABLE SELF-CONTAINED SOLAR POWERED WATER PURIFIER

CROSS REFERENCE TO RELATED APPLICATIONS

This application is a continuation-in-part of patent application Ser. No. 510,104 filed May 11, 1990 entitled "WATER PURIFIER", which is a continuation of parent application Ser. No. 301,177 filed Feb. 21, 1989, also entitled "WATER PURIFIER", now abandoned.

BACKGROUND OF THE INVENTION

The present invention relates to a portable self-contained solar powered water purifier, and more particularly, to such a water purifier which includes an electrolytic purification cell for purifying water into which the purifier is placed.

For sanitation and purification of swimming pools, spas, and other bodies of water, it is well known to use chlorine to destroy living bacteria and algae material in water. Treatment of water through the use of chlorine also results in chemical imbalance, requiring the addition of other chemicals to counteract the effect of chlorine. Further, the amount of chlorine that is required varies from time to time with the amount of usage and weather conditions. It is well recognized that chlorine must also be continually added, at prescribed intervals, to maintain the desired sanitary conditions, and as a result, chlorine is not an efficient nor a particularly economical algaecide agent. In addition, it is not generally accepted as healthful. Furthermore, there is an increasing public awareness of the dangers of handling, storage and use of chlorine for water sanitation purposes.

For a long period of time, it has also been generally known that metallic ions kill or control algae and bacteria. For example, silver is effective to kill or otherwise prevent propagation of most types of bacteria. Copper ions have also been well known as being effective in killing and preventing the growth of algae. Other metallic ions, such as zinc, aluminum, gold and many others, can be used in a similar way, with varying degrees of effectiveness.

Current devices and delivery systems have been historically uneconomical and bulky in utilizing metallic ions. Known devices and equipment have generally utilized high powered electrical equipment (120V or 220VAC power sources or DC electrical currents regulated and controlled from a 120VAC or 220VAC source). As will be appreciated, such equipment is expensive, complicated and generally requires special permanent installation and regular adjustments, thus resulting in high manufacturing and installation costs.

Other known conventional metallic ion devices or delivery systems use low voltages, for example, from 1-30 volts, either AC, DC or reversing DC. Some of the drawbacks with these systems have included excessive gassing, corrosion and accumulation of scales and deposits, which obviously result in reduced efficiency and/or the necessity of repetitive disassembly and cleaning of the devices/systems.

Examples of the high powered metallic ion delivery systems or equipment are shown in U.S. Pat. Nos. 4,328,084 and 4,525,272. An example of a low powered metallic ion delivery device/system is shown in U.S. Pat. No. 4,337,136.

In my aforementioned co-pending continuation and parent applications identified above, I have disclosed a general construction for a portable, self-contained solar powered water purifier. As disclosed, the water purifier includes a buoyant housing having solar cell means supported above water to be treated, purification means in the form of a sacrificial (copper/silver) anode and cathode (spiral wire spring) depending from the housing so as to be positioned in water to be treated, and means for electrically connecting the solar cell means to the purification means to operate the purification means when the purifier is placed in water to be treated. Reference is made to these patent applications for other disclosed features of my solar powered water purifier.

Further research has indicated that additional features should preferably be employed in order to provide a highly efficient and long lasting solar powered water purifier.

Where a hermetically sealed plastic housing is employed for buoyancy, it is difficult to maintain a seal between a substrate supporting the solar cells and the housing. Temperature increase causes the hermetically sealed plastic housing to be warmed up, and air trapped within the housing expands and causes the entire housing to be distorted to a shape which can disrupt or break the seal between the solar cell substrate and the housing. As a result, water can enter in the housing under the solar panel substrate causing corrosion and electrical shorting of exposed electrical contacts.

Another problem relates to the use of galvanized steel wire for the wire spring electrode in the purification cell. It has been discovered that rust and corrosion problems are severe when using galvanized steel wire, which are caused by chemical attack from the chlorine in the water, the water itself, and also a reverse current which generates at night. The difference between the copper/silver electrode and the zinc plating on the galvanized wire electrode causes a reverse current that is generated at night. While this creates a very efficient electrolytic cell, it results in the ionizing of the galvanized wire spring instead of the copper/silver electrode. This was found to occur only at night because the solar panel was not producing enough current to overcome this effect.

Still another problem in the original water purifier system included the use of a cage surrounding the anode and cathode electrodes. It was thought that this cage would eliminate the concern of consumers leery of a shock hazard and also would prevent a stick or other debris from getting stuck in the electrodes. It has been discovered; however, that the cage restricted water flow and did not function in the manner intended, and further resulted in a higher manufacturing cost.

Still a further problem relates to the location of the lanyard ring which enables the user to position the water purifier, as desired. With the prior hermetically sealed plastic housings, a hole had been drilled in the overlapping flanges forming the upper and lower halves of the housing, but it was discovered that in some of the units, the drilled hole allowed water to enter into the hermetically sealed housing, making it heavier and causing it to sink. This was not discovered until heat caused the housing to expand, thus causing water to be sucked in through the drilled hole for the lanyard ring.

While all of the above problems did not result in a totally unworkable unit, they nevertheless presented significant problems which needed to be addressed in order to provide a highly efficient and durable unit for the consumer. In some cases, the previous design shorted out due to water ingestion and became inoperative after an average of 30 days in service. The solutions for these and other problems, as well as new and improved constructions and features, will be discussed in detail below.

SUMMARY OF THE INVENTION

Among the several objects and advantages of the present invention include:

The provision of a portable self-contained solar powered water purifier which overcomes all of the aforementioned deficiencies of the prior art, as well as provides improved constructions and features over those disclosed in my aforementioned prior patent applications;

The provision of the aforementioned water purifier which, through new and improved constructions and features, enhances the performance, efficiency, operation and life of portable self-contained solar powered water purifiers;

The provision of the aforementioned water purifier which provides a sealed environment for electrical connecting means between a solar cell panel and electrolytic purification means, in order to prevent the entry of water therebetween or therein;

The provision of the aforementioned water purifier which discloses various constructions for the buoyant or floatable housing including a hermetically sealed floating element, a hermetically sealed chamber with an expanded plastic foam interior, a rigid foam plastic housing, and a stainless steel housing, and other configurations, all of which are associated with the other components of the water purifier;

The provision of the aforementioned water purifier which provides new and improved constructions for maintaining electrodes in fixed and stable relationship to one another;

The provision of the aforementioned water purifier which includes many other and improved features including a variety of different housings, solar cell constructions, electrodes, and the like, to provide improved performance and operation; and The provision of the aforementioned water purifier in which the aforementioned construction and components provides an efficient, low maintenance, long lasting and durable unit that is also relatively economical in cost and operation as compared to existing toxic chemical systems and also existing ionization systems.

Briefly stated, the portable self-contained solar powered water purifier of the present invention includes housing means for buoyantly supporting the purifier. Solar cell means are supported by the housing means above water to be treated while purification means depend from the housing means so as to be positioned in water to be treated. Electrical connecting means connect the solar cell means to the purification means to enable the purification means to purify water when the purifier is placed therein. Sealing means are provided for sealing the electrical connecting means between the solar cell means and purification means to prevent the entry of water therebetween.

The sealing means surrounds and seals the electrical connecting means between the solar cell means and the purification means and may include either a potting resin or a sealing chamber, depending on the construction of the housing means. Where the housing means comprises a hermetically sealed buoyant element, the sealing means preferably includes a potting resin which surrounds and seals the electrical connecting means. Another preferred technique includes reinforcing struts to prevent deformation of the housing, when subjected to heat, and may be used with the potting compound, for a sealed, non-deformable unit. Other alternative approaches include the use of expanded plastic foam may be injected into the substantially hermetically sealed buoyant element to prevent pressure build-up when subjected to heat, or the buoyant element may be evacuated of air. Another alternative is to use a floatatable foam plastic body for the housing that is not subject to temperature variances, thereby enabling the electrical connection means to be contained in a sealing chamber or environment. A further alternative is to incorporate a bellows or diaphragm which is vented to ambient, in order to grow or shrink with changes in temperature and pressure.

The solar photovoltaic cell means is supported by a substrate which rests on an upper surface of the buoyant housing. An outer peripheral edge of the substrate may include a substrate seal ring that is received within a complementary opening in the upper surface of the housing for sealing the substrate to the housing.

Where the housing is formed as a hermetically sealed buoyant element, it is preferably formed from upper and lower matching half sections including outer peripheral flanges which are in complementary mating engagement with one another. A bumper guard is positioned over the flanges to serve as a shock absorber for the purifier.

The substrate underlying the solar cell means is connected to and supports the sacrificial anode which is preferably formed as a solid cylinder element. The housing means includes a hollow hub section extending therethrough with a smooth inner wall for quick acceptance of a spirally wound wire cathode which surrounds the sacrificial anode.

Where the substantially hermetically sealed buoyant element is used, the hollow hub section may include matching half sections having complementary configured interengaged hub sections, one of which circumferentially surrounds and supports the other, and the other including the inner wall dimensioned for acceptance of the spirally wound cathode wire. Where the buoyant housing comprises a floatatable plastic body, the plastic body may be integrally molded around the hollow hub section.

A conductive bolt extends through the substrate which underlies the solar cell means and is electrically connected thereto. The conductive bolt is also threadably and electrically interconnected to the sacrificial anode for supporting same relative to the substrate.

Separator means are interconnected to an outer free end of the sacrificial anode cylinder and the spirally wound cathode wire to maintain the latter in centered and rigid relationship to the sacrificial anode cylinder. The separator means preferably includes a cap received within the outer end of the spirally wound cathode wire which is connected by a suitable fastener to the lower end of the sacrificial anode cylinder.

In order to position the water purifier as desired, a stanchion is provided on the housing for receipt of a lanyard ring to facilitate positioning of the purifier. Where upper and lower matching half molded plastic sections are used to form a substantially hermetically sealed buoyant element, an integrally molded stanchion is formed in the upper matching half section.

These and other objects and advantages of the present invention will become apparent from the description that is to follow.

BRIEF DESCRIPTION OF THE DRAWINGS

In the drawings.

Corresponding reference numerals will be used throughout the several figures of the drawings.

DESCRIPTION OF THE PREFERRED EMBODIMENT

Figure 1:
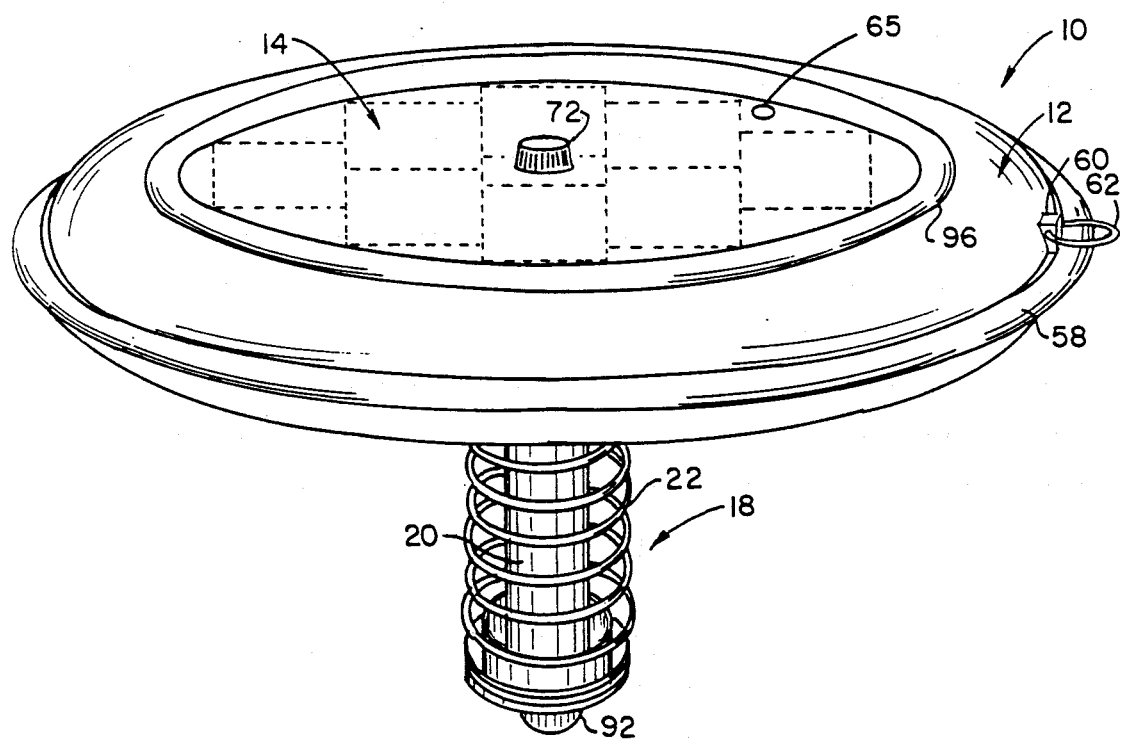
FIG. 1 is a perspective view of one embodiment of portable self-contained solar powered water purifier which is constructed in accordance with the teachings of the present invention.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

The present invention relates to a portable self-contained solar powered water purifier that can be used in swimming pools, spas and other bodies of water. The present invention discloses several different types and constructions of solar powered water purifiers which will be understood by reference to the drawings and the discussion that follows.

The solar powered water purifier 10 shown in the FIGS. 1-7 embodiment includes a buoyant or floatatable housing including solar photovoltaic cell means 14 supported by a substrate 16 which rests on an upper surface of the buoyant housing 12. A purification cell 18 is electrically connected to the solar photovoltaic cell means 14, as will be discussed in detail below, and includes a plurality of electrodes such as an anode 20 and a cathode 22, for purifying water. Preferably, the anode 20 is a sacrificial anode which provides ionized metallic ions for purifying the water while the cathode 20 may be constructed as a removable/insertable spirally wound wire cathode.

Figure 5:
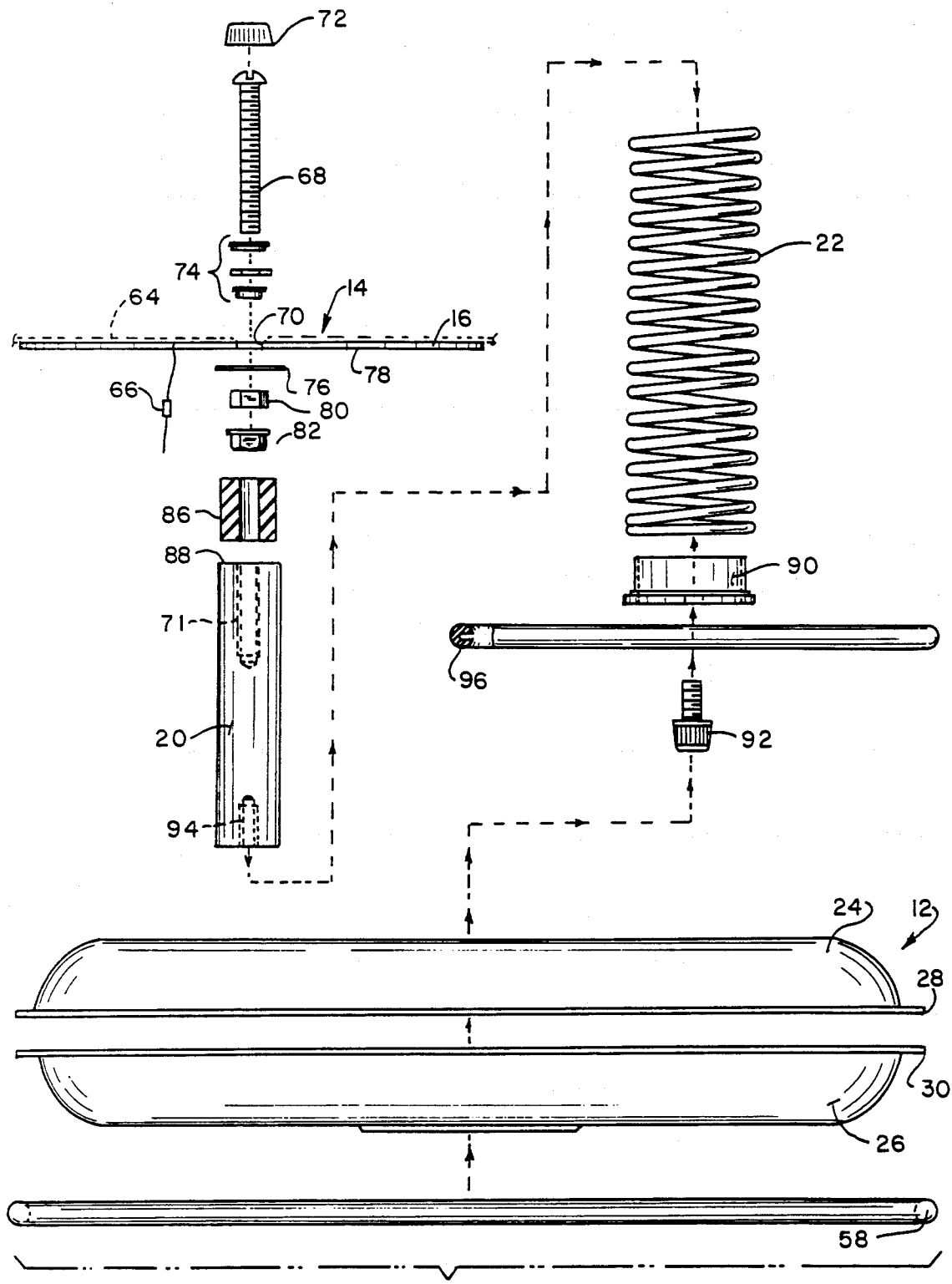
FIG. 5 is an exploded side elevational view, partly in section, of the various components forming the solar powered water purifier shown in FIGS. 1-4.
Figure 6:
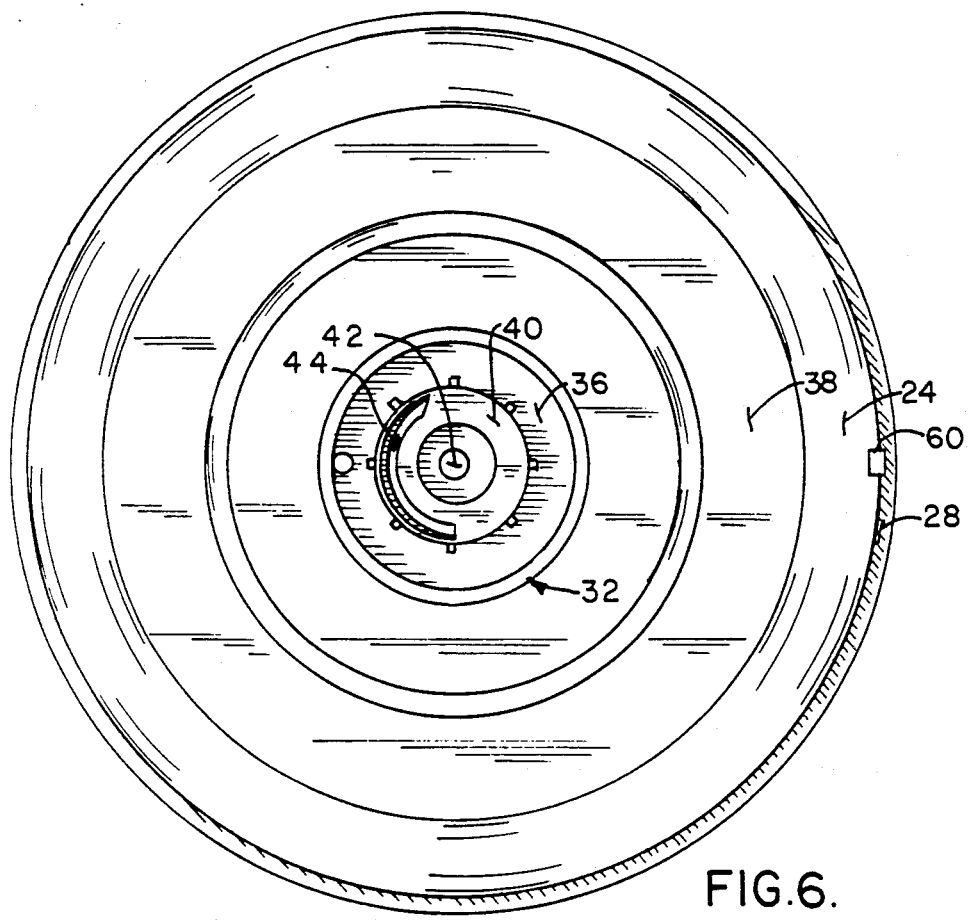
FIG. 6 is a top plan view of the top surface of the plastic housing in the FIGS. 1-7 embodiment, prior to assembly of the other components.

Referring now to the construction of each of the above identified components, it will be seen from the exploded front elevational view of FIG. 5 that the buoyant or floating housing 12 includes upper and lower matching half sections 24, 26, formed from molded plastic in one embodiment, and each including outer peripheral flanges 28, 30 which are in complementary mating engagement with one another.

Figure 4:
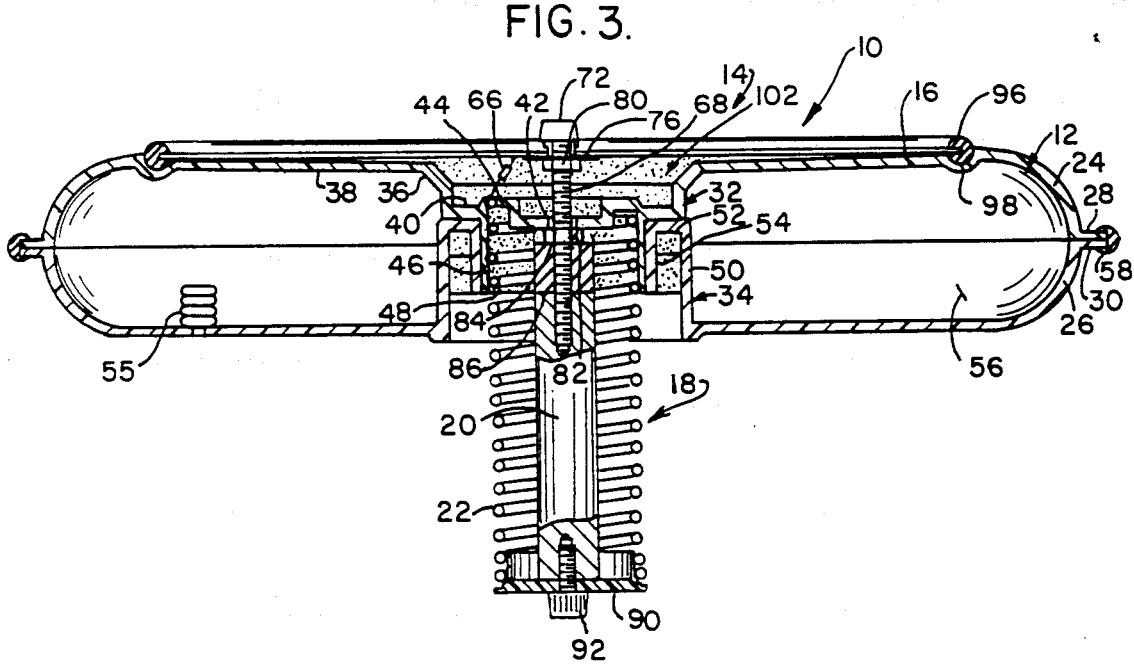
FIG. 4 is a sectional view of the solar powered water purifier illustrated in FIGS. 1-3.

In a central area of each of the upper and lower matching half sections 24, 26, there is provided complementary configured interengaged hub sections 32, 34 extending from the upper and lower matching half sections 24, 26, as best seen in FIG. 4 of the drawings. The upper hub section 32 extends downwardly as a circumferential wall 36 from the upper wall 38, with the circumferential wall 36 terminating at its lower end in a transverse wall section 40. The transverse wall section 40 has an opening 42 for receiving the bolt 68 and an arcuate opening 44 (see FIG. 4 and 6) for receiving a part of the spirally wound wire cathode 22. Specifically, the transverse wall 40 includes an integral depending circumferential wall 46 with a non-threaded smooth wall inner surface 48 dimensioned for easy acceptance of the spirally wound cathode wire 22, as best shown in FIG. 4 of the drawings. As also shown in FIG. 4, the uppermost turn of the spirally wound cathode wire 22 extends through the arcuate opening 44 in the transverse wall 40, enabling the spirally wound cathode wire 22 to be electrically connected to the solar voltaic cell means 14, as will be discussed below. Other ways of securing the spirally wound cathode wire 22 may be used if desired, in order to facilitate removal and replacement, as a removable/insertable cathode.

The hollow hub section 34, extending upwardly from the lower matching half section 26, includes an upwardly extending outer wall 50, a short transverse wall 52, and a reversely directed circumferential wall 54. It will be noted that the circumferential wall 54 of the lower hub section 34 is sized to slidably receive and support the circumferential wall 46 of the upper hub section 32, to facilitate mating engagement between the upper and lower matching half sections 24, 26. In addition, the transverse walls 40, 52 of the upper and lower hub sections 32, 34 abut one another when the upper and lower matching half sections 24, 26 are fully fused or joined to one another.

It will be appreciated that suitable adhesives may be employed between the outer peripheral flanges 28, 30, the transverse walls 40, 52 and the circumferential walls 46, 54 in order to permanently secure the upper and lower matching half sections 24, 26 to one another. Following curing of the adhesive, the buoyant or floatatable housing 12 has a donut or torus-shaped sealed chamber 56. It may be desirable to ultrasonically weld the plastic or employ another technique.

A bumper guard 58 in the form of the large grooved O-ring may be positioned over the flanges 28, 30, to serve as a shock absorber for the purifier. The upper matching half section 12 is further provided with an integrally formed stanchion 60 having an opening therethrough for receiving the lanyard ring 62, to enable the solar powered water purifier 10 to be tethered as desired for positioning.

Once the buoyant or floatatable housing 12 is formed and assembled as described above, the solar voltaic cell means 14, substrate 16 and the purification cell 18, including the sacrificial anode 20 and the spirally wound cathode wire 22, may be assembled thereto.

As previously described above, the inner surface 48 of the circumferential wall 46, associated with the upper hub section 32, is a smooth non-threaded wall dimensioned for easy acceptance of the spirally wound cathode wire 22. Also, this allows for different pitch springs to be utilized for different ionization cell characteristics, as desired. The arcuate opening 44 in the transverse wall 40 of the upper hub section 32 enables the uppermost turn of the spirally wound cathode wire 22 to extend through the transverse wall 40, for electrical connection to the solar photovoltaic cell means 14.

Figure 2:
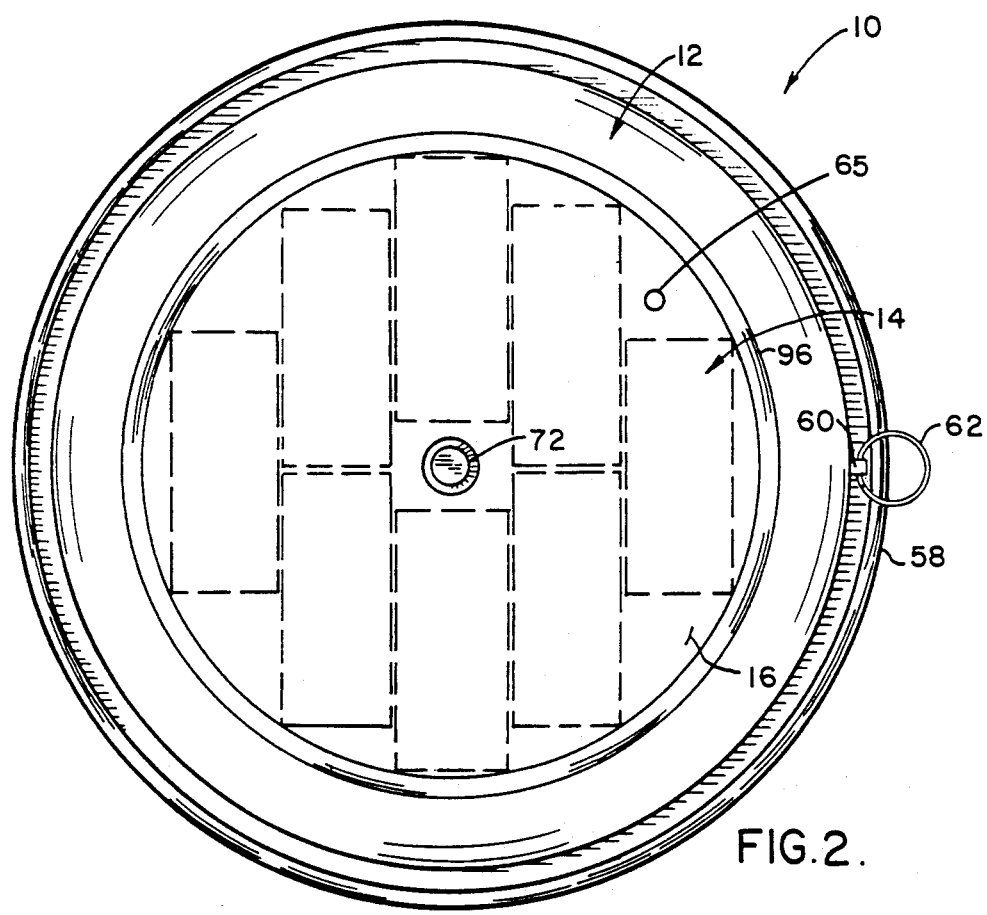
FIG. 2 is a top plan view of the solar powered water purifier shown in FIG. 1 and with solar cells on an upper surface thereof being shown in dotted lines.
Figure 3:
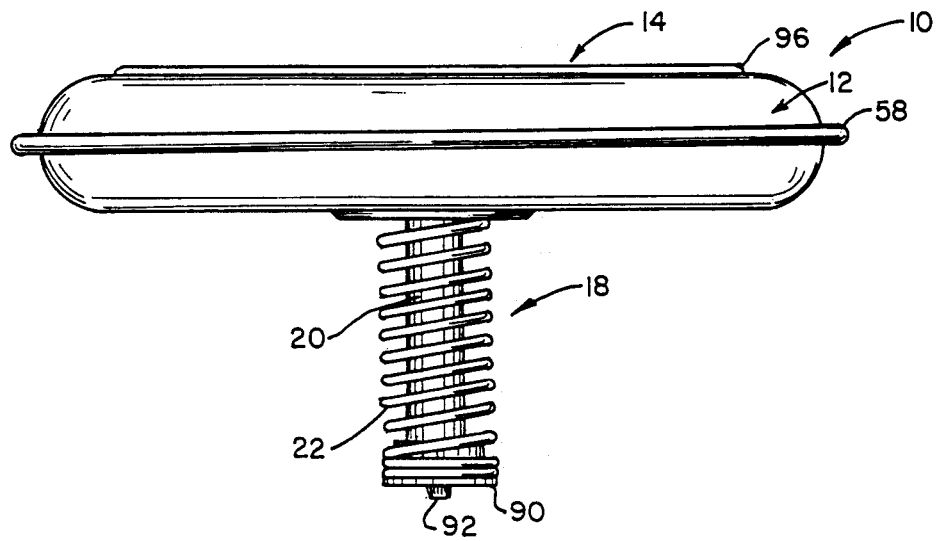
FIG. 3 is a side elevational view of the solar powered water purifier shown in FIG. 1.

The solar photovoltaic cell means 14 consists of a series of photovoltaic cells, as shown in one preferred array in FIG. 2 of the drawings, all of which are electrically connected to each other in order to produce the desired output voltage and amperage necessary to operate the purification cell 18, including the sacrificial anode 20 and spirally wound cathode wire 22. The solar photovoltaic cell means 14, arranged as shown in FIG. 2 or in any other desirable pattern, is suitably secured to the substrate 16. A protective coating 64, as shown in FIG. 5 of the drawings, is applied over solar power cell array 14 to provide a clear and weather protective coating and sealant.

A power status visual indicator 65 is shown in FIGS. 1-2, in the upper half 24 of the housing 12, in the vicinity of the solar cell power array 14, in order to provide a visual reading to the user as to whether power is generated or not. Typically, an LED power status indicator can be connected in series in the photovoltaic circuit. When the water plurifier 10 floats and generates power through the solar cell array 14, the indicator 65 will show that the unit is operating. If there is a fault in the circuitry or if the electrodes are too dirty and need cleaning, the visual indicator will show that the unit is not operating. The power status indicator 65 could be located in the center of the unit, if desired.

As will be appreciated, the solar photovoltaic cell means or solar cell array 14 includes both a positive and negative output terminal (not shown). The negative output terminal may be connected, if desired, via a diode 66, to the uppermost turn of the spirally wound cathode wire 22, as best seen in FIG. 4, in order to prevent reverse current operation of the purification cell, as will be discussed further below. The diode is an optional feature, and may not be required in most constructions when a stainless steel cathode is employed.

A positive terminal of the solar photovoltaic cell means or solar cell array 14, is connected to the sacrificial anode 20, which will now be specifically described.

As shown in FIGS. 4-5, an electrically conductive bolt 68 extends through an aperture 70 in the substrate 16 and is threadably connected to an upper threaded bore 71 in the sacrificial anode 20. The conductive bolt 68 includes an insulating cap 72 which fits over the bolt head, and a series of grommets and washers 74 enable the bolt 68 to be insulated and secured to the substrate 16 as it passes through the aperture 70. A P.C. board washer 76 is positioned/secured to the underside 78 of the substrate 16. The brass bolt 68, in cooperation with the nut 80, conductively secures the electrically conductive washer 76 to the underside 78 of the substrate 16. A second nut (plastic) 82, in cooperation with the bolt 68, positions a rubber sleeve 86 between itself and the upper surface 88 of the sacrificial anode 20, as the bolt 68 threadably engages the upper threaded bore 72 thereof.

When the aforementioned sacrificial anode subcomponents are assembled to the substrate 16 and then to the sacrificial anode 20 as described above, the sacrificial anode 20 will be positioned in an electrically spaced position relative to the spirally wound cathode wire 22, as best seen in FIG. 4 of the drawings. In order to maintain the relationship between the sacrificial anode 20 and the spirally wound cathode wire 22, a plastic cap or closure 90 is inserted into the open lower end of the spirally wound cathode wire 22, and a fastener 92 is engaged within the lower threaded bore 94 of the sacrificial anode 20, thus maintaining the spirally wound cathode wire 22 in centered and rigid relationship to the sacrificial anode cylinder 20. The cap or closure 90 and fastener 92 can be made as an integral component, if desired. Without the use of a cage surrounding the anode 20 and cathode 22, as in my prior parent applications, the flow of water through the cathode wire 22 to the anode 20 is now unrestricted, resulting in better ionization.

In order to seal the substrate 16 and included solar photovoltaic cell means 14 to the buoyant or floatatable housing 12, the outer peripheral edge of the substrate 16 is provided with a substrate seal ring 96 that is received within a complementary opening 98 in the upper wall 38, as best seen in FIG. 4 of the drawings It was discovered; however, in actual consumer testing, that a seal between the substrate seal ring 96 and the complementary opening 98 in the upper wall 38 of the buoyant or floatatable housing 12 will not prevent water from entering beneath the substrate 16 and cause corrosion or electrical shorting of the electrical connections between the solar voltaic cell means 14 and the sacrificial anode 20 and spirally wound cathode wire 22.

Specifically, it was found that the hermetically sealed buoyant or floatatable housing 12 tends to expand, when exposed to heat. Air trapped inside of the donut or torus-shaped chamber 56 expands, when heated. This distorts or bloats the shape of the housing 12 from the flat saucer shape toward an oblate shape. As a result, it is very difficult to seal the substrate 16 to an initially flat upper wall 38 which subsequently distorted under heat, into a rounded shape. As a result, water has seeped in under the lower panel substrate 16 causing corrosion and shortage of the unprotected electrical contacts, in the area of the upper hub section 32. Corrosion and electrical shortage of the electrical contacts results in an inoperative unit, which can occur in a relatively short period of time, once water has seeped in under the solar panel substrate 16.

Figure 7:
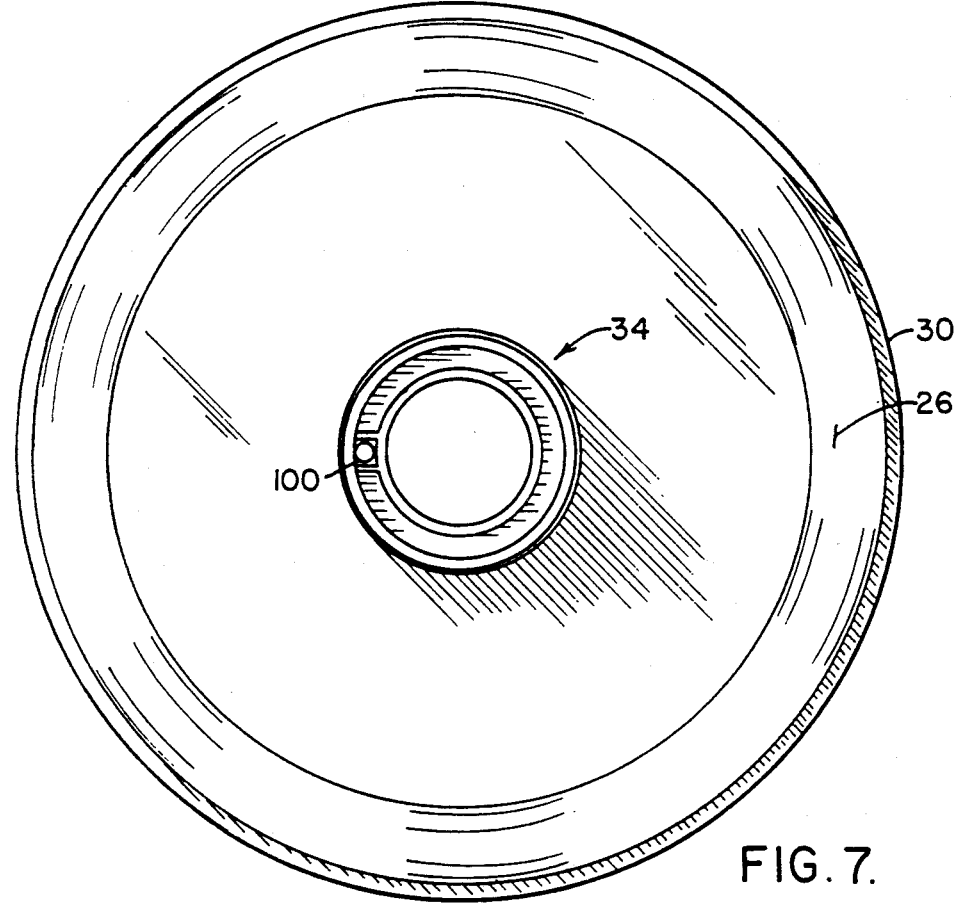
FIG. 7 is a bottom plan view of the plastic housing element used in the FIGS. 1-7 embodiment and showing an opening for injecting liquid potting resin into the housing element electrical area.

There are several ways in which this problem can be overcome. One preferred way is to form an opening 100 in a part of the transverse wall 52 of the lower hub section 34, as best seen in FIG. 7, with a corresponding opening in the transverse wall 40 of the upper hub section 32. This can be done by suitably molding the opening in place during manufacture or by subsequently drilling such an opening. Through the opening 100, a suitable potting compound can be injected into all open areas in the upper and lower hub sections 32, 34 such that upon curing, the potting compound 102 completely seals the electrical connecting means between the solar photovoltaic cell means 14 and the anode 20 and spirally wound cathode wire 22. As shown in FIG. 4 of the drawings, the cured potting compound completely fills all open areas in the upper and lower hub section 32, 34, including to a level corresponding with the lower edge of the reversely directed circumferential walls 54 of the lower hub section 34.

In addition, the upper wall 38 of the buoyant or floatatable housing 12, beneath the panel substrate 16, is constructed to taper generally from the complementary opening toward the upper hub section 32. This allows the rubber seal ring 96 on the outer peripheral edge of the solar panel substrate 16 to seal better and further allows a little space between the substrate 16 and the upper wall so that the potting compound can bond the lower surface of the solar panel substrate 16 and the upper surface of the upper wall 38 to each other. As a result, the electrical connection between the lower voltaic cell means 14 and the anode 20 and cathode 22 are sealed and prevent water from entering therebetween. This allows the solar powered water purifier 10 to function, as intended.

Figure 8:
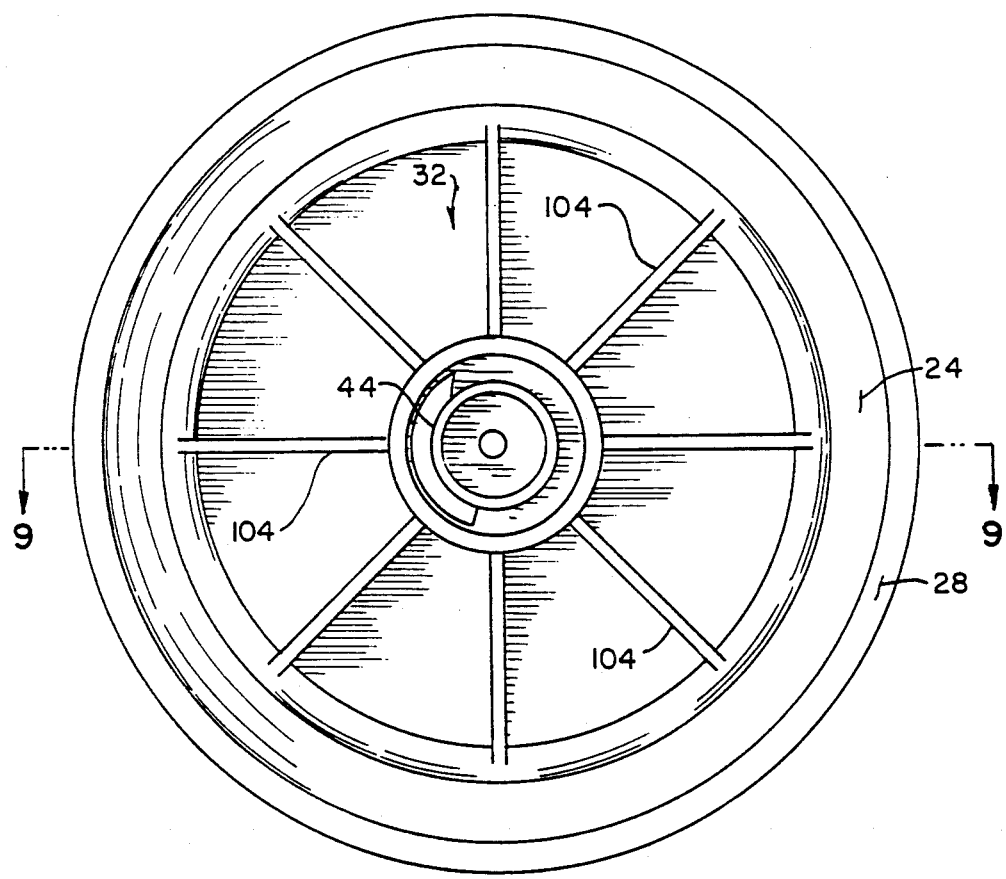
FIG. 8 is a view of a modified form of buoyant plastic hollow element wherein the top surface thereof is formed with a series of radial struts to prevent deflection of the upper surface.
Figure 9:
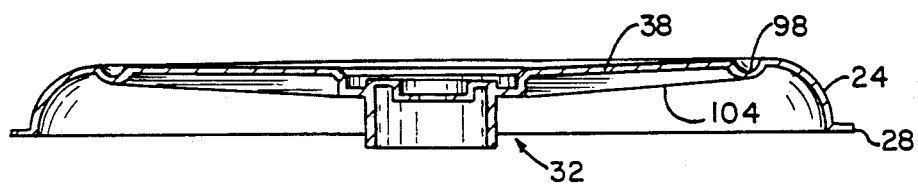
FIG. 9 is a sectional view of the embodiment shown in FIG. 8 with the radially extending strut reinforcements.

Another preferred way to correct and/or assist in solving the sealing problem is shown in FIGS. 8-9 of the drawings. There, it will be seen that the upper wall 38 must be provided with a series of radially extending struts 104 to prevent deflection of the upper wall 38 underneath the solar panel substrate 16, thereby to maintain a sealed relationship of solar panel substrate 16 and the upper wall 38 of the buoyant or floatatable housing 12 through the outer peripheral seal ring 96. The struts or stiffening gussets 104 prevent deformation of the top half 24 of the housing 12, while the bottom half 26 may expand without affecting the seal. The struts 104 may be used by themselves or with the potting compound to correct the sealing problem. In actual use, the potting compound alone was insufficient to correct the sealing problem, thus requiring the use of the struts 104. However, in certain situations, the potting compound alone or the struts alone may be sufficient to overcome the sealing problem.

The use of a vacuum within the housing 12 would prevent any deformation or expansion from heat and could also be beneficially employed, if desired.

Figure 10:
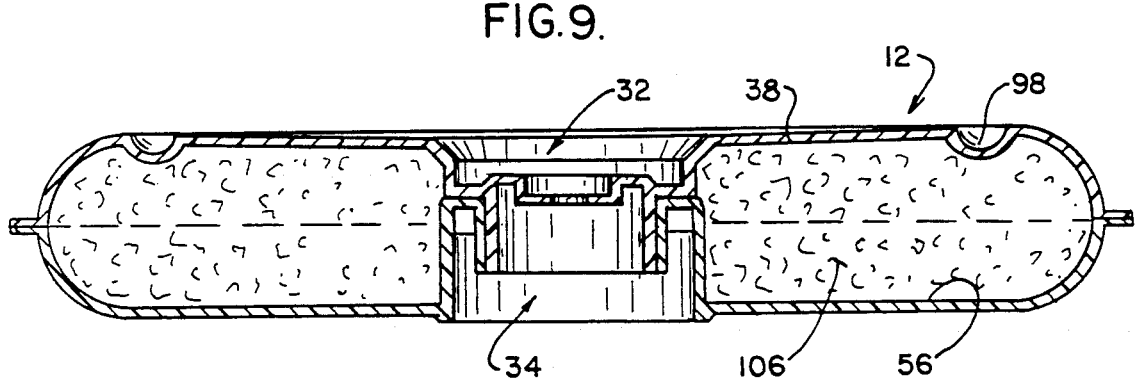
FIG. 10 is a sectional view of a further modified embodiment in which expanded foam plastic is injected within the hollow areas of the buoyant element to prevent expansion thereof.

Another method of preventing pressure build-up within the donut or torused-shaped chamber 56 of the buoyant or floatatable housing 12 is to inject expanded plastic foam 106 into the chamber 56, as shown in FIG. 10 of the drawings. As a result, the buoyant or floatatable housing 12 is not subject to distortion or bloating, as would be the case with a open chamber 56, as shown in FIG. 4 of the drawings. Still another technique would to be employ an expandable "balloon", bellows or diaphragm within the buoyant or floatatable housing 12, and vented on one side to ambient pressure, which would grow or shrink when there are changes in the temperature and pressure. In FIG. 4, a bellows 55 is attached to the lower half sections 26 and located within the chamber 56. The bellows 55 is vented to atmosphere through the lower half section 26 to allow the bellows 55 to grow or shrink due to temperature and pressure changes.

Figure 11:
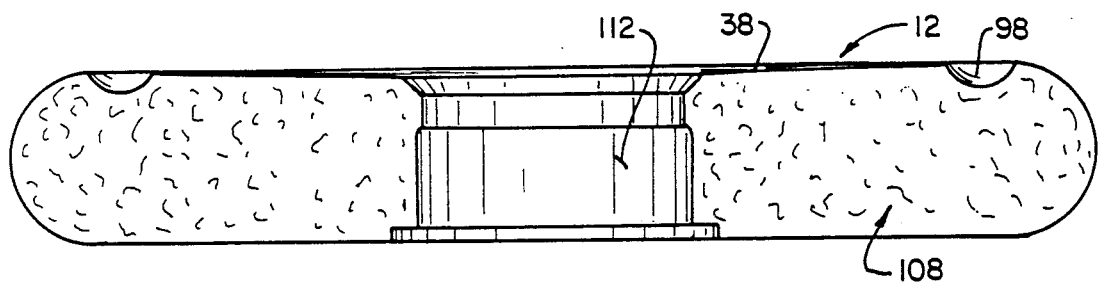
FIG. 11 is a sectional view showing a buoyant housing formed from a floatatable plastic body such as foam plastic, for example.
Figure 12:
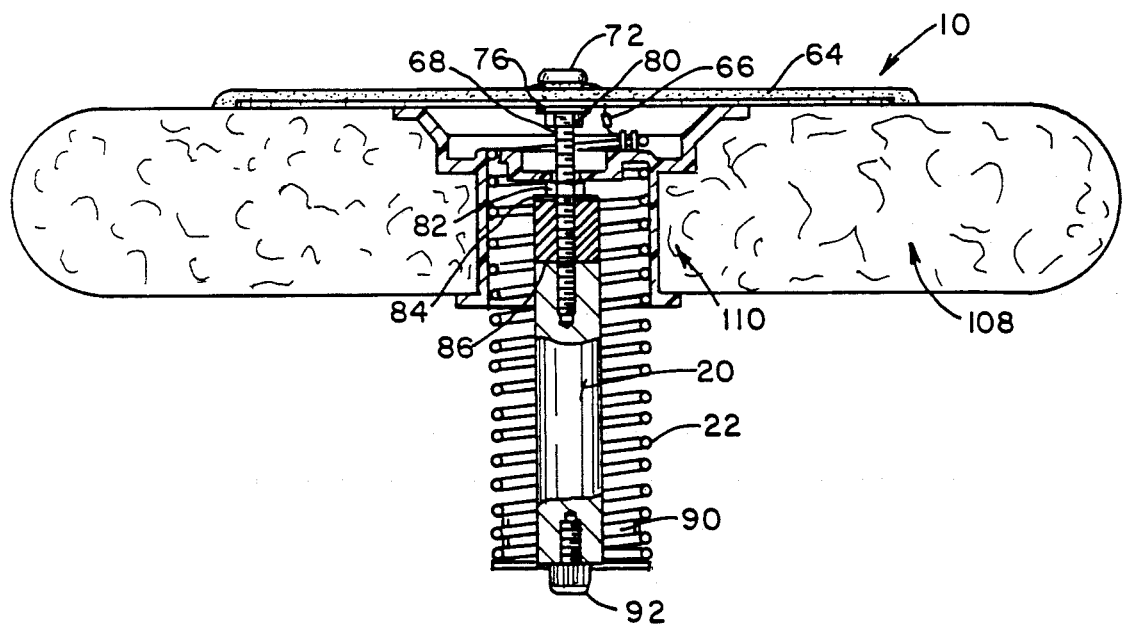
FIG. 12 is a sectional view of a solar powered water purifier embodiment formed with a floatatable foam plastic body as shown in FIG. 11 and including a hub section about which the solid plastic body is mounted.
Figure 13:
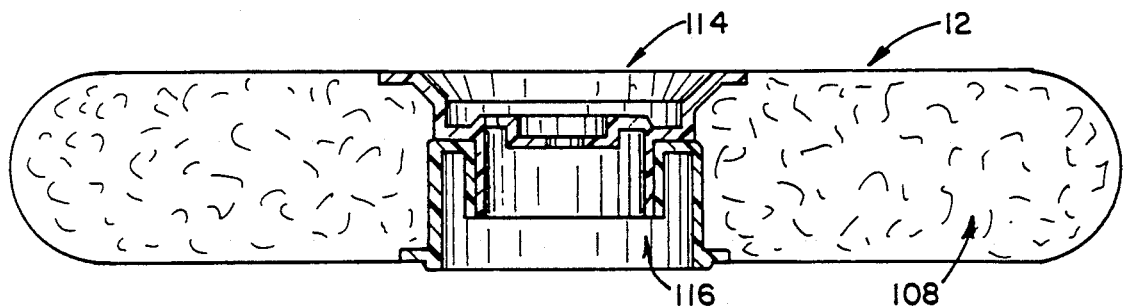
FIG. 13 is a sectional view of a modified form of hub section used in a molded in place floatatable foam plastic body construction.

Yet still another approach is shown in FIGS. 11-13 of the drawings where a rigid plastic foam buoyant or floatatable housing 12 is molded into the shape 108. In such a construction, a single hub section 110, as shown in FIG. 12, may be insert molded into the opening 112 of the floatatable plastic foam body 108 or, alternatively, upper and lower hub sections 114, 116, generally similar to the upper and lower hub sections 32, 34 in the FIGS. 1-7 embodiment, but without the remaining portions of the upper and lower matching half sections 24, 26, may be formed in a similar manner, as shown in FIG. 13 of the drawings.

In the FIGS. 11-13 embodiment, the other components of the solar powered water purifier 10 will remain substantially unchanged, modified only to the extent necessary to enable the floatatable foam plastic body 108 to be conformed thereto. In this regard, it will be noted in FIGS. 11 that complementary opening 98 may be formed in the upper surface of the body 108 to receive a seal ring 96 of the solar panel substrate 16, while the upper wall 38 of the body 108 may be constructed to taper, as shown, to provide a better seal for the solar panel substrate 16 peripheral seal ring 96 in its engagement within the complementary opening 98. FIGS. 12-13 show the floatatable plastic body without the opening 98 and without the seal ring 96. Instead, the solar panel substrate 16 is sealed to the solar panel substrate 16 through the use of an overlying covering and sealant that is also bonded to the upper surface of the floatable foam plastic body 108. Other variations along this line may be employed where a floatable foam plastic body 108 is employed, as will be understood. Whether a single hub section 110, as shown in FIG. 12, or upper and lower hub section 114, 116, as shown in FIG. 13, are used depends upon economical and functional features in a particular embodiment, and the manufacturer's desires.

Still even a further way of correcting the sealing problem while providing a uniquely constructed unit is to stamp the upper and lower matching half sections 24, 26 out of stainless steel and then weld the outer peripheral flanges 28, 30 to provide a hermetically sealed unit. Alternatively, the upper half section 24 could be made of plastic, while the lower half 26 is made of stainless steel. The stainless steel upper and lower matching half sections 24, 25 may then be sufficiently rigid by themselves, so as to avoid the need for using a potting compound to seal the electrical components. If the upper half 24 is made of plastic rigid struts or other features discussed above can be used. With matching stainless steel upper and lower half sections 24, 26, the solar cells 14 can be fused or otherwise attached to the top half section 24 with the positive terminal output from the solar cells being connected to the sacrificial anode 20. In this case, there would be no need for a cathode made of stainless steel since the whole housing, being made of stainless steel or other electrically conductive material, can operate as the cathode or negative element to which the negative output terminal from the solar cells 14 can be connected. Thus, there would be a need for a single anode extending from the stainless steel housing to provide an operating unit, unless plural electrodes are desired for other purposes, as discussed below. The same would be true for and upper plastic half section 24 and a lower stainless steel section 26.

There are several other new and important features of the present invention. One optional feature relates to preventing reverse current flow between the sacrificial anode 20 and the cathode 22. It has been discovered that galvanized steel wire, used for the spirally wound wire cathode 22, may create a problem in the system. At night, when the solar voltaic cell means 14 is not producing current, it was discovered that reverse current was generated because of the difference between the copper/silver anode and the zinc plating on the galvanized steel wire used in the spirally wound cathode wire 22. While this was a very efficient electrolytic cell, it resulted in the ionizing of the galvanized steel wire instead of the copper/silver anode. Chlorine in the water and the water itself also cause rust and corrosion of the galvanized steel wire, due to such reverse current generated at night which exposed unprotected steel wire.

To prevent this effect, the galvanized steel wire was replaced by a stainless steel wire spring cathode which does not generate anything near the power as a copper and zinc electrolytic cell. Other electrode materials include titanium and the like. Furthermore, the diode 66 may be employed between the negative terminal of the solar voltaic cell means 14 and the upper turn of the spirally wound cathode wire 22, thus preventing any reverse current at night or at any other time. Thus, only the sacrificial anode 20 provides ionized metallic ions, rather than the metal from which the spirally wound cathode wire 22 is made.

Figure 18:
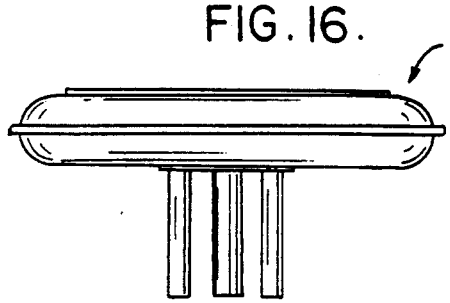
FIG. 18 is a reduced in size side elevational view of a modified water purifier with a plurality of electrodes extending therefrom.

It is possible to use dual or triple electrodes, to allow for two or three way switching or cleaning action. FIG. 18 shows such a modified water purifier design. Thus, a switch could be employed to activate only certain of the electrodes for ionization, while allowing others to be activated for cleaning purposes or production of oxidizer substance, i.e., ozone or chlorine. Also, for hard water applications, an essentially aluminum alloy may be utilized to enable the aluminum to be agglomerated with the calcium and filtered out. A typical arrangement would be one electrode of stainless, one of copper alloy, or two electrodes with an electrically conductive housing.

It is also possible to integrate a current switching device or alternator to reverse the current every so often in order to clean the electrodes. In the larger in line ionizer units, this is done with two electrodes normally. In the water purifier of the present invention, reversing current on a periodic basis would cut the ionization time accordingly because of the non-ionizing stainless steel spring. Complete and instant cleaning of the electrodes can also be accomplished by immersing the electrodes into a jar of dilute acid.

Figure 14:
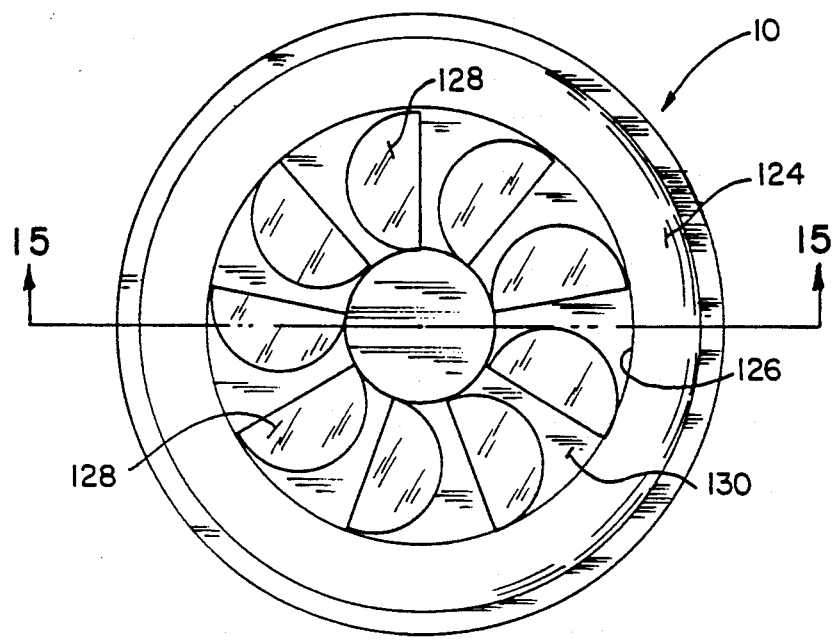
FIG. 14 is a top plan view of another modified form of water purifier in which a different array of solar cells are embedded in a cavity of the upper half of the housing and secured in place by a clear, ultra-violet resistant potting resin.
Figure 15:
FIG. 15 is a sectional view of the modified water purifier shown in FIG. 14 as viewed along line 15—15 thereof.

Reference is now made to other modified forms of the invention shown in FIGS. 14–17 of the drawings. In FIGS. 14–15, the upper half 24 is provided with a cavity 126 to receive a circumferential array of semi-circular shaped solar cells 128 which are arranged about the cavity 126, as illustrated, and secured in place by a clear, ultra-violet potting resin 130. Alternatively, a clear plastic or glass lens could be used to secure the solar cells 14 in place. As can be appreciated, this will result in an integrated and waterproof assembly, avoiding some of the sealing problems with other embodiments. Of course, the solar cells 128 as well as the solar cells 14 may have any geometric shape desired.

Figure 16:
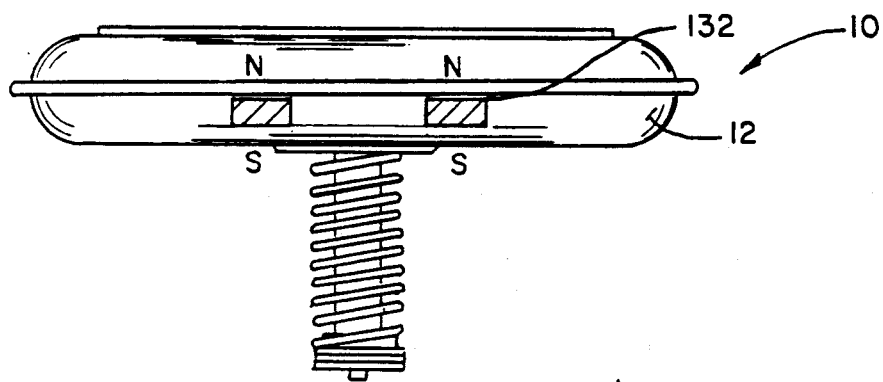
FIG. 16 is a side elevational view of yet still another modified form of water purifier which includes magnets for magnetic conditioning of the water, as well.
Figure 17:
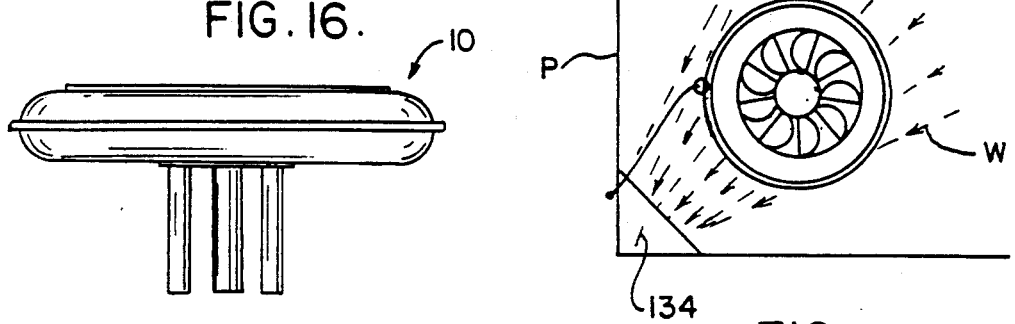
FIG. 17 is a reduced in size top plan view of the modified water purifier of FIG. 16 and illustrating water flow past the water purifier for deposit in a pool drain.

In FIGS. 16–17 of the drawings, a torus shaped magnet 132 is positioned within the housing 12 of the water purifier 10 to establish the magnetic lines of force, as desired. The purpose of the torus shaped magnet 132 or any other suitably shaped and positioned magnet or magnets is to effect magnetic conditioning of the water. As a non-chemical treating system, magnetic conditioning of water is generally achieved by attaching magnetic units to be outside of pipes for scale control and removal within the pipes. In the present invention, by positioning the water purifier 10 with magnets 132 in the vicinity of a pool drain or inlet 134 of pool P, as shown in FIG. 17, the water W will flow past the water purifier 10, and the magnetic lines of force from the magnet 132 will extend generally perpendicular to the water W flowing to the pool drain 134. This enables the magnet 132 to condition the water by altering various minerals suspended in the water W. It will be appreciated that various types and kinds of single or multiple magnets may be used, to meet the particulars desired. The magnet(s) may be located in a variety of position, i.e. within the buoyant housing, within the anode or at the end of the anode. It's also possible to alloy the anode to be permanently magnetic itself It will be further appreciated that the water purifier 10 with magnets 132 could be placed in other locations within a pool, although the location shown in FIG. 17 may be the preferred location.

The water purifier device of the present invention, as with any other copper/silver ionization system reduces, but does not eliminate, the requirement for an oxidizer such as chlorine. The oxidizer or chlorine reduction can be as much as 90% reduced, but is still required in most climates. In harsh conditions such as in Los Angeles, more oxidizer will be required to avoid less than clear water. In extreme cases, up to half the normal chlorine will be required, whereas in mild climates, no chlorine may be required at all. There is also a synergistic relationship between the copper ions produced by the water purifier and the reduced amounts of chlorine used, producing excellent clean water results.

The amount of oxygen produced by the water purifier is relatively small, generated by only about 4 watts of power. In comparison to pool size, this can be quite small, although it does help.

It is also possible to self-generate an oxidizer out of a salty solution. By introducing salt, as sodium chloride, (at a concentration of approximately 10%–20% of ocean saltines) in a pool being cleaned by the water purifier of the present invention, an oxidizer (chlorine) will result. An alloy of platinum and gold, or other catalytic electrode in the water purifier will produce sufficient chlorine in such an environment, with copper ions.

From the foregoing, it will be appreciated that the solar powered water purifier 10 of the present invention, now improved through the various features disclosed herein, will function to convert solar energy into electrical energy, through the solar voltaic cell means 14, causing ionized metallic copper, silver ions to be released from the sacrificial anode 20, while the cathode 22 works in conjunction with the sacrificial anode 20. Sealing the electrical connection means between the solar cell array 14 and the anode 20/cathode 22 results in continuous and long term operation of the purifier 10. A power indicator 65 visually indicates that the system is in an operating or non-operating condition. The anode 20 and cathode 22 are maintained in rigid relationship by use of the cap 90 extending within the lower open end of the spirally wound cathode wire 22 which is secured to the sacrificial anode 20 by the fastener 92. Whether using a potting resin, an expanded foam insert, rigid struts in the upper wall of the buoyant housing, a pressure compensating diaphragm, a floatatable foam plastic body construction or a stainless steel body the present invention maintains a sealed relationship of the electrical connection means between the solar photovoltaic cell means 14 and the anode 20/cathode 22 or the anode and an entire stainless steel housing serving as a cathode, for continuous operation over an extended period. In addition, various types of housings disclosed herein offer various economic alternatives, whether using hermetically sealed and/or filled housings or a separately formed plastic foam body, with one or more hub sections insert molded therein.

In view of the above, it will now be seen that the several objects and features of this invention are achieved and other advantageous results ar obtained.

As various changes could be made in the above constructions without departing from the scope of the invention, it is intended that all matter contained in the above description or shown in the accompanying drawings shall be interpreted as illustrative and not in a limiting sense.

I claim:

1. A portable self-contained solar powered water purifier comprising:
   housing means for buoyantly supporting the purifier;
   solar cell means supported by the housing means above water to be treated;
   purification means depending from the housing means so as to be positioned in water to be treated;
   means for electrically connecting the solar cell means to the purification means to enable the purification means to purify water when the purifier is placed therein; and
   means for sealing the electrical connecting means between the solar cell means and purification means to prevent the entry of water therebetween, said sealing means including a sealing chamber within the housing means which surrounds and seals the electrical connecting means between said solar cell means and said purification means.

2. The purifier as defined in claim 1 wherein said sealing means includes a potting compound in said sealing chamber.

3. The purifier as defined in claim 1 wherein said housing means comprises a substantially hermetically sealed chamber with an expanded polyurethane plastic foam injected therein.

4. The purifier as defined in claim 1 wherein said housing means includes a floatable foam plastic body.

5. The purifier as defined in claim 1 wherein the housing means includes expandable/retractable means vented to atmosphere to accommodate changes in temperature and pressure.

6. A portable self-contained solar powered water purifier comprising:
   housing means for buoyantly supporting the purifier;
   solar cell means supported by the housing means above water to be treated;
   purification means depending from the housing means so as to be positioned in water to be treated;
   means for electrically connecting the solar cell means to the purification means to enable the purification means to purify water when the purifier is placed therein;
   means for sealing the electrical connecting means between the solar cell means and purification means to prevent the entry of water therebetween; and
   said housing means including a substantially hermetically sealed hollow buoyant element, said housing means being constructed to prevent distortion thereof when subjected to heat.

7. The purifier as defined in claim 6 wherein said housing means includes struts for reinforcing the housing means against distortion when exposed to heat.

8. The purifier as defined in claim 7 and further including a potting compound which surrounds the electrical connection means between said solar cell means and said purification means within said hermetically sealed hollow buoyant element.

9. The purifier as defined in claim 6 wherein a vacuum is drawn within said substantially hermetically sealed hollow buoyant element to resist distortion thereof.

10. A portable self-contained solar powered water purifier comprising:
    housing means for buoyantly supporting the purifier;
    solar cell means supported by the housing means above water to be treated;
    purification means depending from the housing means so as to be positioned in water to be treated;
    means for electrically connecting the solar cell means to the purification means to enable the purification means to purify water when the purifier is placed therein;
    means for sealing the electrical connecting means between the solar cell means and purification means to prevent the entry of water therebetween; and
    said housing means being made of electrically conductive material with sufficient rigidity to overcome distortion thereof when subjected to heat, said electrically conductive material housing means interacting with said purification means to purify water.

11. A portable self-contained solar powered water purifier comprising:
    housing means for buoyantly supporting the purifier;
    solar cell means supported by the housing means above water to be treated;
    electrolytic purification means depending from the housing means so as to be positioned in water to be treated and including sacrificial anode means providing ionized metallic ions and cathode means;
    means for electrically connecting the solar cell means to the electrolytic purification means to enable the electrolytic purification means to purify water when the purifier is placed therein;

said sacrificial anode means being made from an alloy consisting of at least copper; and said housing means being formed from electrically conductive material, said electrically conductive material housing means serving as said cathode means to interact with said sacrificial anode means in purifying water.

12. The purifier as defined in claim 11 wherein said cathode means is shaped as a spirally wound cathode wire which surrounds the sacrificial anode means.

13. The purifier as defined in claim 13 wherein said solar cell means has a positive output terminal connected to said sacrificial anode means and a negative output terminal connected to said electrically conductive material housing.

14. A portable self-contained solar-powered water purifier comprising:

housing means for buoyantly supporting the purifier;

solar cell means received within an upper cavity of said housing means to support the solar cell means above water to be treated;

clear sealing means for securing and sealing said solar cell means within the upper cavity of said housing means while enabling the sun to activate the solar cell means, said clear sealing means comprising a clear lens;

purification means depending from the housing means so as to be positioned in water to be treated; and means for electrically connecting the solar cell means to the purification means to enable the plurification means to purify water when the purifier is placed therein.

15. The purifier as defined in claim 14 wherein the clear sealing means is a clear potting compound.

16. A portable self-contained solar powered water purifier comprising:

housing means for buoyantly supporting the purifier;

solar cell means supported by the housing means above water to be treated;

purification means depending from the housing means so as to be positioned in water to be treated;

means for electrically connecting the solar cell means to the purification means to enable the purification means to purify water when the purifier is placed therein; and magnetic means positioned within the housing means for magnetic conditioning of the water.

17. The purifier as defined in claim 16 wherein the purifier is located in the vicinity of flowing water to facilitate the activation of said magnetic means.

18. A portable self-contained solar powered water purifier comprising:

housing means for buoyantly supporting the purifier;

solar cell means supported by the housing means above water to be treated;

purification means depending from the housing means so as to be positioned in water to be treated and including sacrificial anode means and cathode means;

said sacrificial anode means being formed as a solid cylinder and providing ionized metallic ions for purifying the water;

said cathode means being formed as a spirally wound wire cathode which surrounds said sacrificial anode means and providing abstraction of electrons to facilitate the release of oxygen into the water;

means for electrically connecting the solar cell means to the sacrificial anode means and cathode means to provide purification of water when the purifier is placed therein;

a substrate underlying said solar cell means and supported by an upper surface of said buoyant housing means, said substrate being connected to and supporting said sacrificial anode means at least partially below water to be treated when the purifier is placed therein; and said housing means including a hollow hub section extending therethrough for receiving said spirally wound wire cathode in order to support same at least partially below water to be treated when the purifier is placed therein.

19. The purifier as defined in claim 18 wherein said housing means comprises a substantially hermetically sealed hollow buoyant element, and said hollow hub section is integrally connected to said buoyant element.

20. The purifier as defined in claim 19 wherein said substantially hermetically sealed hollow buoyant element includes matching half sections having complementary configured interengaged hub sections, one of said hub sections circumferentially surrounding and supporting the other of said hub sections, and said other of said hub sections including an inner wall dimensioned for acceptance of said spirally wound cathode wire.

21. The purifier as defined in claim 18 wherein said housing means comprises a floatable foam plastic body which is integrally molded around said hollow hub section.

22. The purifier as defined in claim 21 wherein said hollow hub section includes matching half sections having complementary configured interengaged hub sections, one of said hub sections circumferentially surrounding and supporting the other of said hub sections, and said other of said hub sections including an inner wall dimensioned for acceptance of said spirally wound cathode wire.

23. A portable self-contained solar powered water purifier comprising:

a buoyant housing;

solar photovoltaic cell means supported by a substrate which rests on an upper surface of said buoyant housing;

a sacrificial anode being formed as a solid cylinder and being electrically interconnected to said solar photovoltaic cell means to provide ionized metallic ions for purifying the water;

a spirally wound wire cathode surrounding said sacrificial anode cylinder and being electrically interconnected to said solar photovoltaic cell means to provide for the abstraction of electrons facilitating the release of oxygen into the water;

a hollow hub section included in said housing and supporting said spirally wound wire cathode therefrom;

a conductive bolt extending through said substrate and being electrically connected to said solar cell, said conductive bolt being threadably and electrically interconnected to said sacrificial anode for supporting same relative to said substrate; and means for sealing the electrical connections between said solar photovoltaic cell means and said sacrificial anode and said spirally wound wire cathode to prevent the entry of water therebetween.

24. The purifier as defined in claim 23 and further including power indicator means to visually indicate an on or off condition of said plurifier.

25. The purifier as defined in claim 23 and further including separator means interconnected to an outer free end of said sacrificial anode cylinder and said spirally wound cathode wire to maintain said spirally wound cathode wire in centered and rigid relationship to said sacrificial anode cylinder.

26. The purifier as defined in claim 23 wherein an outer peripheral edge of the substrate includes a substrate seal ring that is received within a complementary opening in the upper surface of said housing for sealing the substrate to the housing.

27. The purifier as defined in claim 26 wherein the housing is a substantially hermetically sealed buoyant element, and said means for sealing the electrical connections between said solar photovoltaic cell means and said sacrificial anode and spirally wound cathode wire comprises a potting compound contained within and sealing said aforementioned components in said housing.

28. The purifier as defined in claim 27 wherein the hermetically sealed buoyant element includes an opening for receiving the potting compound in liquid form within for sealing said aforementioned components in said housing when said potting compound is cured.

29. The purifier as defined in claim 26 wherein said housing is a hermetically sealed buoyant element and is formed from upper and lower matching half sections including outer peripheral flanges which are in complementary mating engagement with one another, and a bumper guard positioned over the flanges serving as a shock absorber for said purifier.

30. The purifier as defined in claim 29 wherein the upper matching half section includes an integrally molded stanchion for receipt of a lanyard ring to facilitate positioning of the purifier.

31. The purifier as defined in claim 23 wherein said housing is a hollow buoyant element which is filled with expanded foam plastic.

32. The purifier as defined in claim 23 wherein said housing is a hermetically sealed buoyant element and the upper surface thereof is tapered underneath the substrate supporting the solar photovoltaic cell means, said substrate including a substrate seal ring received in a complementary opening of the upper surface of said housing for sealing the substrate to the housing, said tapered upper surface assisting the substrate seal ring in sealing the substrate to the housing.

33. The purifier as defined in claim 23 wherein said housing is a hermetically sealed buoyant element and the upper surface thereof underneath the substrate is provided with a series of rigid struts to prevent deflection of the upper surface during pressure build-up.

34. The purifier as defined in claim 33 wherein said separator means includes a cap inserted into an outer open end of said spirally wound cathode wire, said cap having an included fastener that is fastened to said sacrificial anode cylinder.

35. The purifier as defined in claim 23 wherein said buoyant housing comprises a floatable foam plastic body which is integrally mounted around said hollow hub section.

36. The purifier as defined in claim 35 wherein said hollow hub section includes matching half sections having complementary configured interengaged hub sections, one of said hub sections circumferentially surrounding and supporting the other of said hub sections, and said other of said hub sections including said inner wall for complementary reception of said spirally wound cathode wire.

37. The purifier as defined in claim 23 and further including separator means interconnected to an outer free end of said sacrificial anode cylinder and said spirally wound cathode wire to maintain said spirally wound cathode wire in centered and rigid relationship to said sacrificial anode cylinder.

38. A portable self-contained solar powered water purifier comprising:
    housing means for buoyantly supporting the purifier;
    solar cell means supported by the housing means above water to be treated;
    purification means depending from the housing means so as to be positioned in water to be treated and including sacrificial anode means providing ionized metallic ions for purifying the water and cathode means providing abstraction of electrons to facilitate the release of oxygen into the water;
    means for electrically connecting the solar cell means to the electrolytic purification means to enable the electrolytic purification means to purify water when the purifier is placed therein; and
    diode means for preventing reverse current flow between the anode means and cathode means.

39. A portable self-contained solar-powered water purifier comprising:
    housing means for buoyantly supporting the purifier;
    solar cell means received within an upper cavity of said housing means to support the solar cell means above water to be treated;
    purification means depending from the housing means so as to be positioned in water to be treated, said purification means comprising multiple electrodes with switching means for activating certain of the electrodes for operation; and
    means for electrically connecting the solar cell means to the purification means to enable the purification means to purify water when the purifier is placed therein.

* * * * *